May 23, 1950  N. C. WALKER ET AL  2,508,877
GARBAGE COLLECTOR TRUCK
Filed Nov. 14, 1947  3 Sheets-Sheet 3
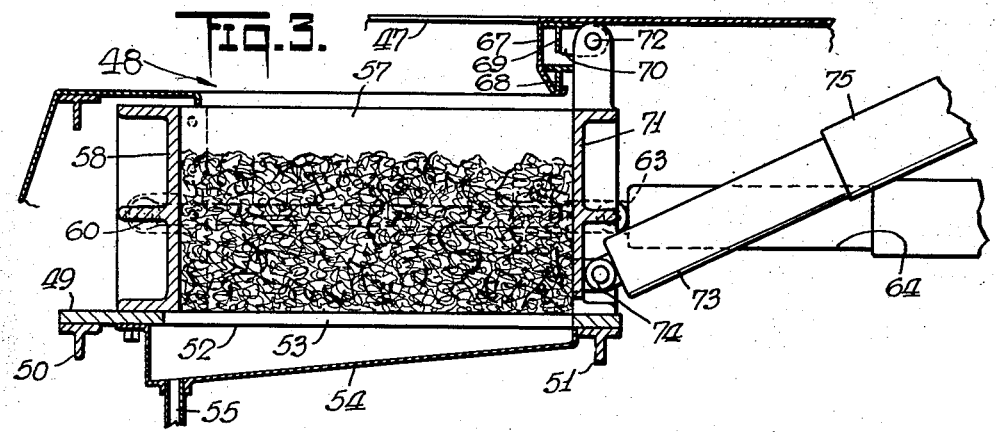
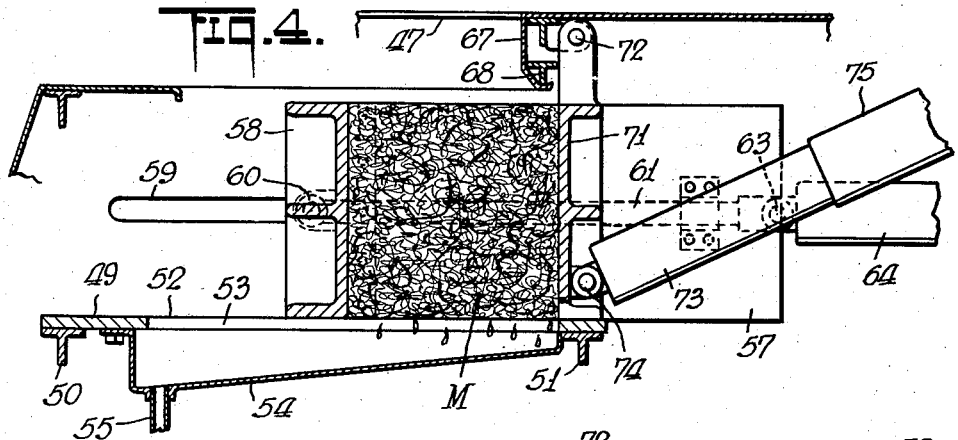
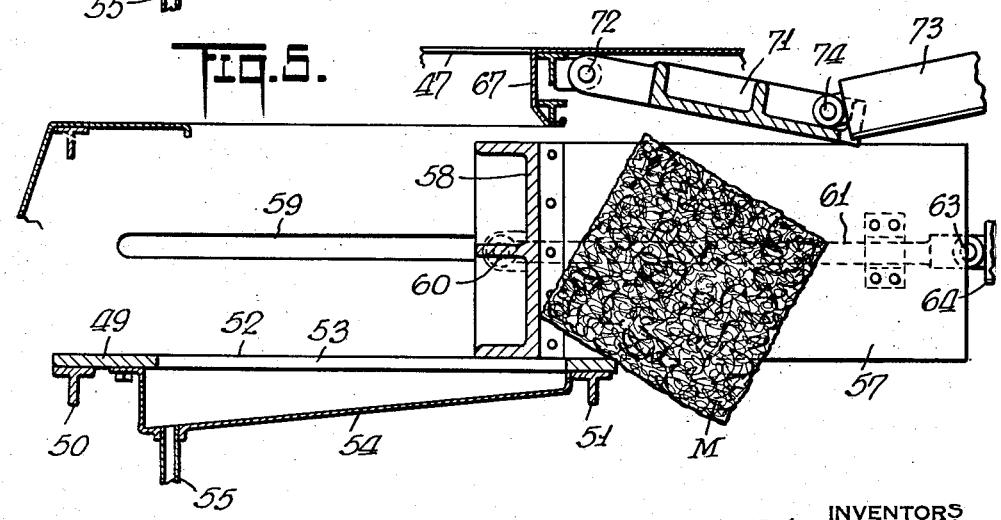
INVENTORS
Nelson C. Walker
George W. Gmitter
BY
J. G. Basseches
their ATTORNEY Patented May 23, 1950

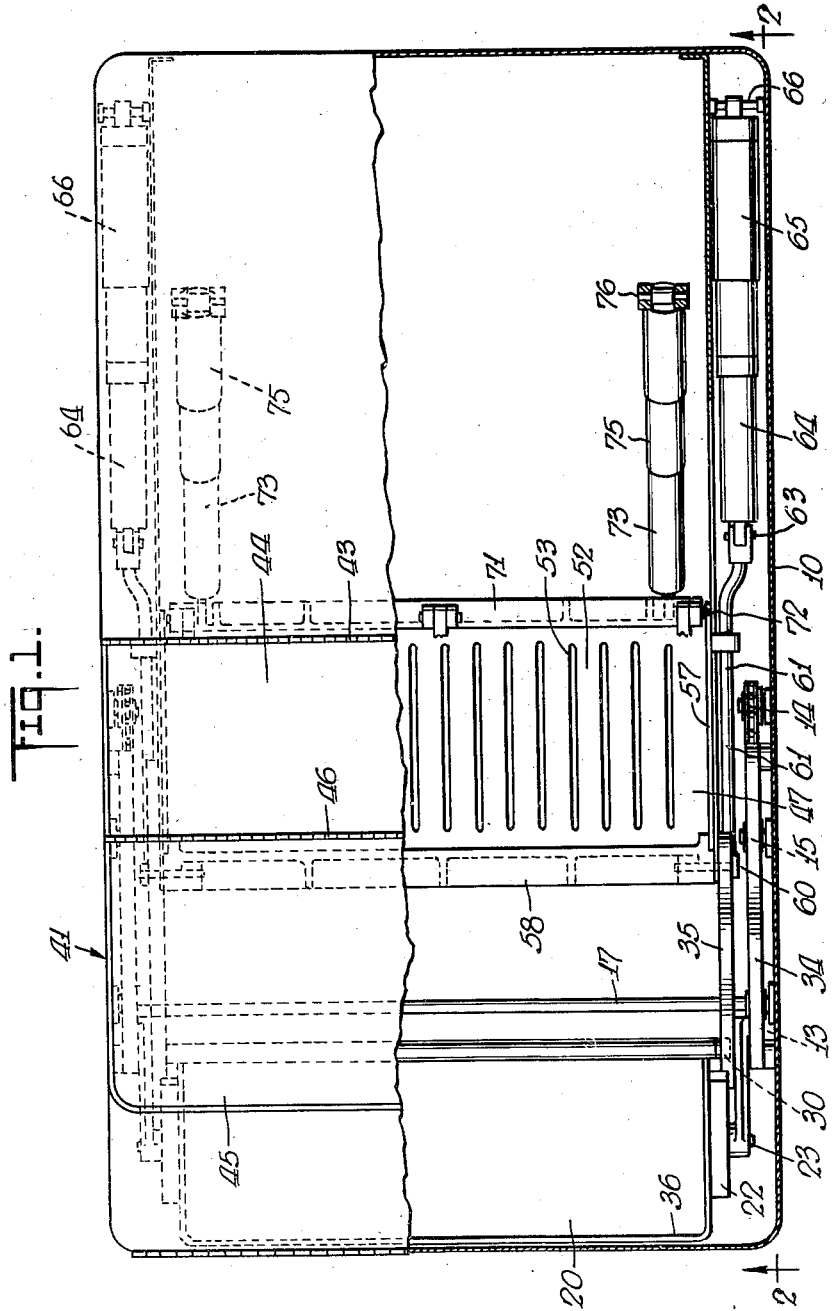

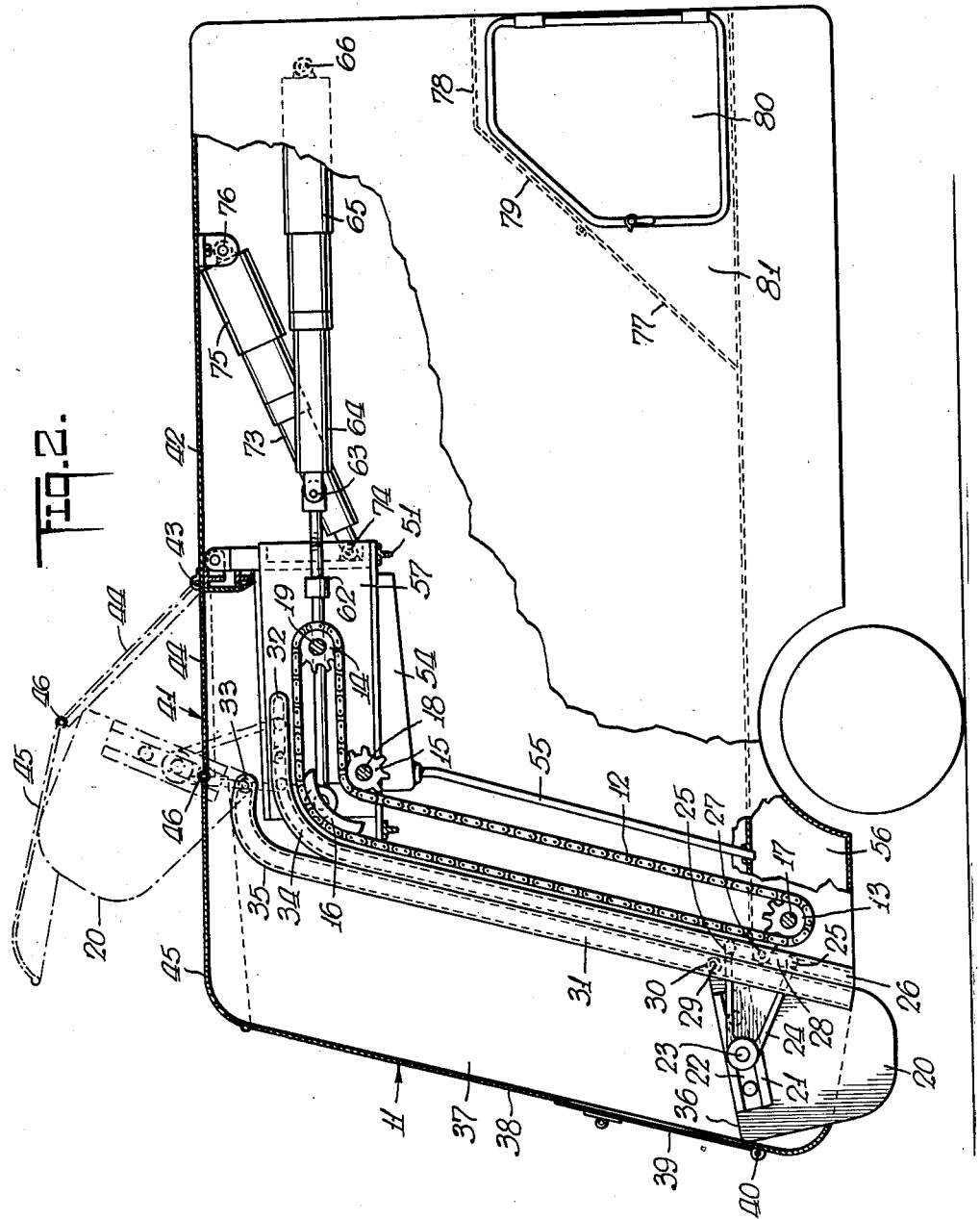

2,508,877

UNITED STATES PATENT OFFICE 2,508,877

GARBAGE COLLECTOR TRUCK

Nelson C. Walker, Montclair, and George W. Gmitter, Jersey City, N. J., assignors to City Tank Corporation, Corona, N. Y., a corporation of New York Application November 14, 1947, Serial No. 786,132

7 Claims. (Cl. 214—67)

This invention relates to garbage collector trucks.

It is an object of this invention to provide in a garbage collecting truck or the like a low level bucket or hopper filling receptacle which is conveyed by power means to an upper level in the truck for discharging into the truck body, including as features thereof the compacting of a bucket charge, and to further include as the features thereof, the compacting of a charge of the garbage to separate therefrom fluid material.

A still further object of the invention is the provision of a garbage collecting truck which includes as features thereof the compacting of loads to utilize the truck body to maximum capacity, by compacting individual loads, without unduly weighting the truck body, characterized by the features of compressing and compacting small charges of the garbage and loading the truck body with the compacted charge.

Still further objects of this invention reside in the provision of a garbage collecting truck in which motive power of low capacity may be utilized to the maximum degree, while obtaining utilization of the capacity of the truck body.

To attain these objects and such further objects as may appear herein or be hereinafter pointed out, reference is made to the accompanying drawing, forming a part hereof, in which:

Figure 1 is a plan view, partly in section, of a truck body in accordance with this invention;

Figure 2 is a section taken on the line 2—2 of Figure 1;

Figures 3, 4 and 5 are fragmentary sectional views of the compactor in different positions thereof.

Making reference to the drawing, there is provided a truck body 10 which may be mounted upon an automobile chassis in a manner readily understood. The tail assembly 11 includes conveyer chains 12 threaded over sprockets 13, 14 and 15 and the guide 16. The sprockets thus described are mounted on transverse shafts 17, 18 and 19, running across the width of the truck body 10, to operate in unison, with suitable power means (not shown) for driving the conveyor chain. A bucket 20 has the end plates thereof provided with guide plates 21, having guides 22 to receive the headed pin 23 trunnioned in the bracket 24. Guide pins 25 ride in the track 26, running from adjacent the lower end of the truck body upwardly and terminating in a curved path at the top of the truck body.

A tie lug 27 is mounted on the conveyor chain 12 and is connected to the base 28 of the bracket 24. The bucket 20 is provided with a roller 29, having a headed portion 30 within the bucket track 31. The bucket track 31 runs substantially parallel to the bracket guide tracks 26. The tracks 26 terminate at stop portions 32 and 33, respectively, it being observed that upon elevation of the bucket 20, the path of movement of the bucket 20 will remain unaltered until encountering the curvilinear portions 34 and 35 of the tracks 26 and 31, respectively, at which point the bucket is inverted to a position discharging the contents thereof by directing the mouth portion 36 downwardly.

The bucket operates within a housing 37, whose end plates 38 include a fill door 39, hinged about a hinge 40 adjacent the low point of the bucket 20 for filling the same.

The housing adjacent its upper end is provided with an articulated cover 41, hinged to the top 42 of the truck by the hinge 43. The cover 41 includes a front segment 44 and a rear segment 45, hinged to each other by the hinge 46. The articulated cover 41 gravitationally overlaps the opening 47 adjacent the uppermost portion of the truck body near the rear thereof.

Beneath the opening 47 there is provided a compacting assembly 48, shown in detail in Figures 3, 4, and 5, which comprises a bottom grate 49 supported on beams 50 and 51 transversely of the body. Cross bars 52 define slots 53 in the grate 49. Beneath the slots 53 there is positioned a drip pan 54, having a rearward pitch, with a run-off pipe or conduit 55 leading to a storage receptacle 56 adjacent the bottom of the truck. Side plates 57 are arranged in parallelism over the grate 49 and move with the plunger plate 58 riveted to each of the side plates 57 guided on the grate 49. Guides 59 receive the ends of the coupling pins 60, to connect the plunger plate 58 with the connecting rods 61, guided to the outside of the plates 57 by the guides 62, and by the wrist pin and knuckle coupling 63 to the plunger 64 of a hydraulic ram cylinder 65, anchored by the cross pin 66. The source of power for operating the plunger 64 is not shown, but this detail will be readily understood, and includes a control leading adjacent the rear of the truck body for manual operation.

The inner end of the grate adjacent the beam 51 cooperates with the side plates 57 and the apron 67 to form a bottom closure, being held in this position by the upper cross beam 68. Suspended from the beam 69 and the extension arm 70, there is provided a hinged bottom wall 71, suspended by the pintles 72 normally to close the gap previously described. The bottom wall 71 is actuated by the hydraulic ram 73, whose front end is connected by the knuckle 74 to the bottom wall 71. The cylinder 75 of the hydraulic ram is hinged to the supporting angle 76 adjacent the front end of the truck body. Hydraulic pipe lines for operating the hydraulic ram 73 and the controls therefore are not shown, but it will be understood that they may have a manual control adjacent the wheel of the truck.

With the construction described, it will be readily understood that for loading the bucket 20, the trap door 39 is hinged out of the way to fill a charge of garbage or like debris into the bucket. When the bucket 20 is full, the chain hoist 12 may be put into operation by a control to guide the same to the upper level shown in dotted lines in Figure 2. As the bucket rises, it lifts the cover assembly 41 out of position, shielding the bucket until it is tilted in discharging position over the opening 47 immediately above the grate 49. Thereupon, or by repeated operation, the ram 64 is operated to compress the charge of garbage and express any fluid material therefrom through the grate slots 53.

The hydraulic ram for the bottom wall 71 is maintained at a predetermined pressure, thereby to compress the charge to a set limit. Thereafter, the operation of the plunger 73 is timed to retract the same with regard to the plunger 58 and discharge the block-shaped mass M into the interior of the truck.

The truck is provided with a deflecting baffle wall 77, with a horizontally offset portion 78 and a hinged door 79. The charge from the compression hopper, as it is ejected, will strike the baffle 77 and be moved to the rear of the truck body, to fill the same. A side door 80 forms a closure for the compartment 81, to store incompressible material, such as bedsprings and other large objects which may be collected.

It will thus be observed that by this construction low level loading may be secured, with filling adjacent the upper portion of the truck body. Each charge has the fluid content drained therefrom and is compressed, and during compression the charge has the fluid contents further expressed therefrom and separated.

The positioning of the charge adjacent the baffle assures a complete load of individually compressed charges, to secure the maximum filling capacity of the truck. As the truck lurches forward, the combination of the baffle 77 and the form of the load further directs each block of mass toward the rear of the truck. It will further be observed that by compacting each individual charge, the retaining walls of the truck need not be too massive since the compacting operation is confined to the packing assembly and the remainder of the truck walls are for storage only.

What is claimed is:

1. In a refuse collecting truck body, including in combination, a low level loading receptacle including elevator means for moving the same to a filling opening of the truck body at a high level on said truck body and having a discharge end leading into the truck body, a screening hopper assembly adjacent said last opening having a drainage duct for by-passing fluids and plunger means acting against a yielding wall of the hopper to discharge said refuse so screened through said discharge end into the truck body.

2. In a refuse collecting truck body, including in combination, a filling opening adjacent the upper portion of said body, a compression hopper and a plunger operating therein for compacting refuse within said hopper at said upper portion of said body, said hopper having a discharge opening, and a baffle in said body resisting the action of said plunger against the refuse to distribute the discharged mass in said body through said opening as a compacted mass.

3. In a refuse collecting truck body, a filling opening adjacent the upper end thereof, including in combination, a hopper including a screening bottom having by-passing duct means for collecting the fluid contents separated from said refuse, a compacting plunger member including motive power therefor, a bottom wall member against which said compacting member acts, said bottom wall member being movable to discharge the compacted mass into said truck body gravitationally.

4. In a refuse collecting truck body, a filling opening adjacent the upper end thereof, including in combination, a hopper including a screening bottom having by-passing means for collecting the fluid contents, a compacting plunger member including motive power therefor, a bottom wall member against which said compacting member acts, said bottom wall member being movable to discharge the compacted mass into said body gravitationally and an angularly directed baffle for spreading the mass into the truck body.

5. In a refuse collecting body comprising, in combination, an opening adjacent the top thereof, a conveyor leading to said opening, bucket means connected with said conveyor for lifting refuse from a low level to said filling opening, a hopper adjacent said opening comprising fixed side walls and movable end walls, and power means for moving said end walls toward each other and discharging the compacted mass in the truck body.

6. In a refuse collecting body comprising, in combination, an opening adjacent the top thereof, a conveyor leading to said opening, bucket means connected with said conveyor for lifting refuse from a low level to said filling opening, a hopper adjacent said opening comprising fixed side walls and movable end walls, and power means for moving said end walls toward each other, one of said end walls including predetermined holding means yielding under pressure of said other end wall and having a discharge opening for directing the compressed material into the truck body.

7. In a refuse collecting body comprising, in combination, an opening adjacent the top thereof, a conveyor leading to said opening, bucket means connected with said conveyor for lifting refuse from a low level to said filling opening, a hopper adjacent said opening comprising fixed side walls and movable end walls, and power means for moving said end walls toward each other, one of said end walls including predetermined holding means yielding under pressure of said other end wall, said yielding wall including power driven means to move the same to and from closing position.

NELSON C. WALKER.
GEORGE W. GMITTER.

REFERENCES CITED

The following references are of record in the file of this patent:

UNITED STATES PATENTS

| Number | Name | Date |
|---|---|---|
| 1,088,104 | Sharp | Feb. 24, 1914 |
| 1,345,963 | Gunturiz y Santos | July 6, 1920 |
| 1,458,240 | Otterson | June 12, 1923 |
| 2,084,656 | Rottee | June 22, 1937 |
| 2,087,435 | Hubbert | July 20, 1937 |

FOREIGN PATENTS

| Number | Country | Date |
|---|---|---|
| 628,189 | Germany | Mar. 30, 1936 |
| 761,436 | France | Jan. 5, 1934 |